(12) United States Patent
Korcz et al.

(10) Patent No.: US 8,710,367 B2
(45) Date of Patent: Apr. 29, 2014

(54) GANGABLE ELECTRICAL BOX AND LEVELING ASSEMBLY

(75) Inventors: Krzysztof W. Korcz, Granger, IN (US); Mahran H. Ayrton, South Bend, IN (US)

(73) Assignee: Hubell Incorporated, Shelton, CT (US)

( * ) Notice: Subject to any disclaimer, the term of this patent is extended or adjusted under 35 U.S.C. 154(b) by 136 days.

(21) Appl. No.: 13/118,715

(22) Filed: May 31, 2011

(65) Prior Publication Data

US 2012/0305307 A1     Dec. 6, 2012

(51) Int. Cl.
*H01H 9/02* (2006.01)

(52) U.S. Cl.
USPC .............. 174/53; 174/559; 174/50; 439/535; 248/906

(58) Field of Classification Search
USPC ............. 174/53, 559, 50; 220/3.92; 439/535; 248/906
See application file for complete search history.

(56) References Cited

U.S. PATENT DOCUMENTS

| | | | |
|---|---|---|---|
| 740,663 A | 10/1903 | Krantz | |
| 915,381 A | 3/1909 | Pullets | |
| 1,296,811 A * | 3/1919 | Keeler | 220/3.92 |
| 1,772,313 A * | 8/1930 | Hoffman | 220/3.92 |
| 1,875,101 A | 8/1932 | Morrell | |
| 1,929,844 A | 10/1933 | Haas | |
| 2,707,221 A | 4/1955 | Frank | |
| 2,917,199 A * | 12/1959 | Appleton | 220/3.7 |
| 3,587,906 A | 6/1971 | Pepe | |
| 4,496,067 A | 1/1985 | Benscoter | |
| 4,634,015 A | 1/1987 | Taylor | |
| 5,042,673 A | 8/1991 | McShane | |
| 5,117,996 A | 6/1992 | McShane | |
| 5,594,207 A | 1/1997 | Fabian et al. | |
| 6,198,045 B1 | 3/2001 | Roesch | |
| 6,229,087 B1 | 5/2001 | Archer | |
| 6,566,600 B1 | 5/2003 | Ford et al. | |
| 6,710,245 B2 | 3/2004 | Roesch et al. | |
| 6,878,877 B1 | 4/2005 | Cozzi et al. | |
| 6,953,894 B2 | 10/2005 | Ungerman et al. | |
| 7,342,173 B1 | 3/2008 | Kidman | |
| 7,576,284 B2 | 8/2009 | Dinh | |
| 7,618,284 B2 * | 11/2009 | Lamoureux et al. | 439/535 |
| 7,628,286 B2 | 12/2009 | Lalancette | |
| 7,659,478 B2 | 2/2010 | Schlachter | |
| 7,910,826 B1 | 3/2011 | Shotey et al. | |
| 7,910,828 B1 | 3/2011 | Shotey et al. | |
| 2004/0251043 A1 | 12/2004 | Chung | |
| 2011/0067896 A1 | 3/2011 | Baldwin et al. | |

\* cited by examiner

*Primary Examiner* — Dhirubhai R Patel

(74) *Attorney, Agent, or Firm* — Garrett V. Davis; Mark S. Bicks; Alfred N. Goodman

(57) ABSTRACT

A gangable electrical box includes an adjustment assembly for adjusting the position and angle of an electrical device mounted in the box. The adjustment assembly includes independently adjustable leveling members coupled to opposite end walls of the box. A side member is slidably coupled to a side wall and extends between the end walls. The side wall engages the leveling members and is adjustable with the adjustment of the leveling members.

26 Claims, 7 Drawing Sheets

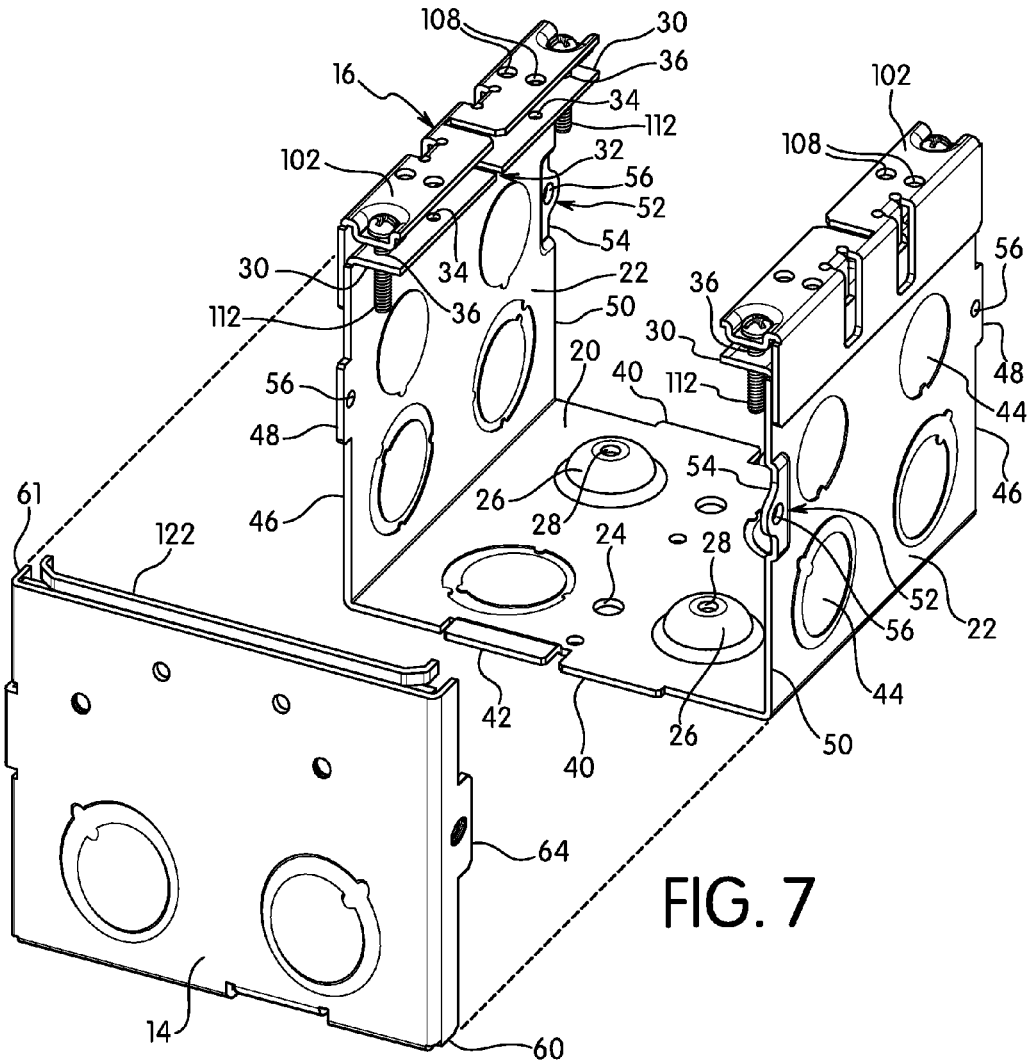
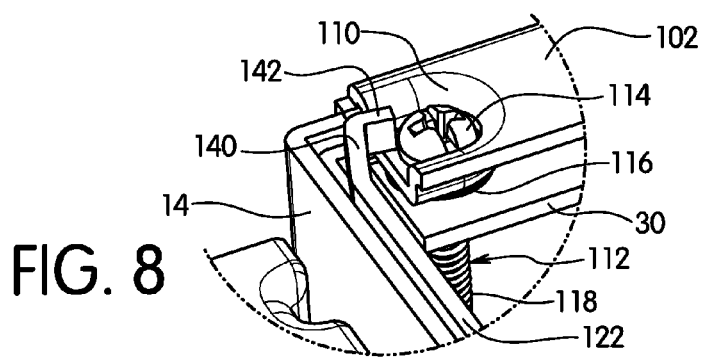

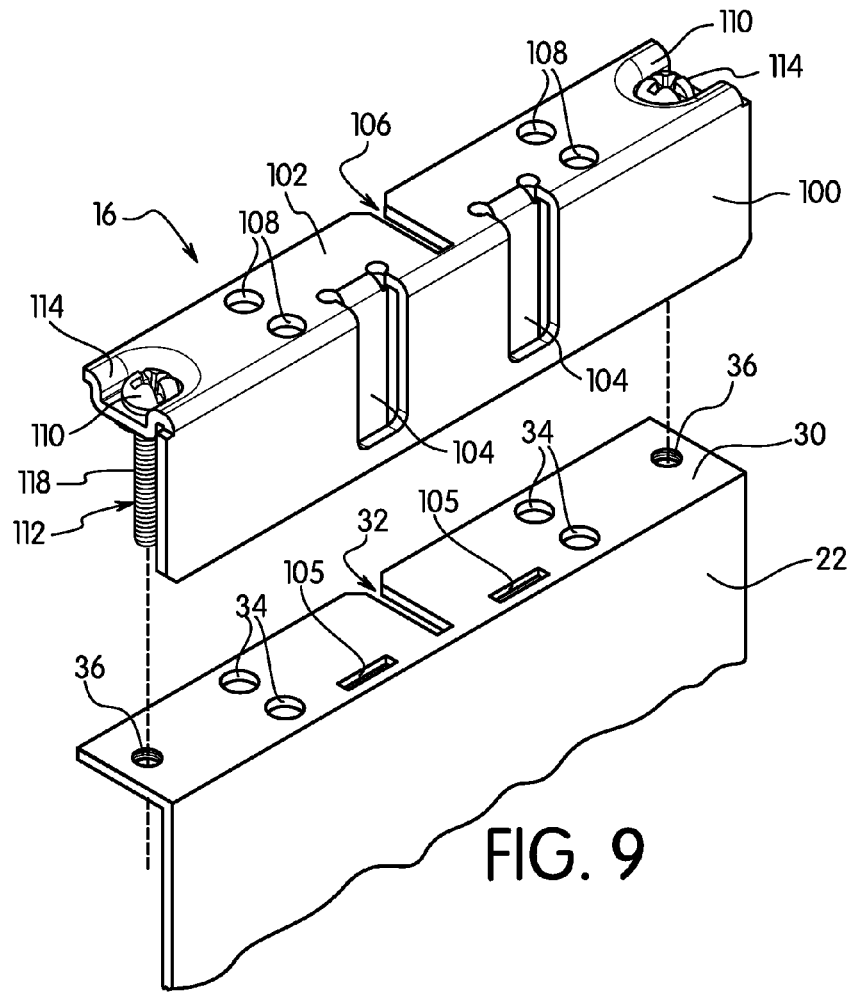
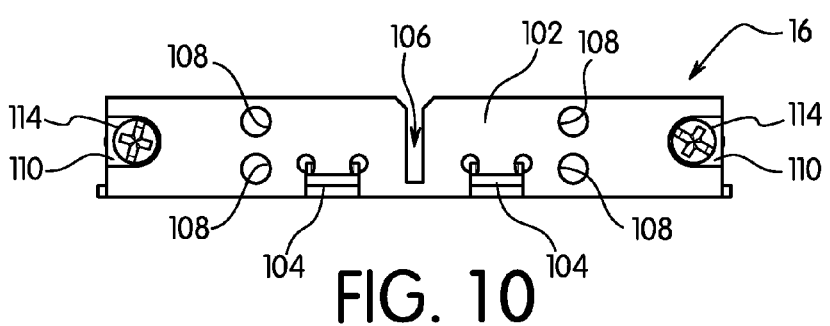
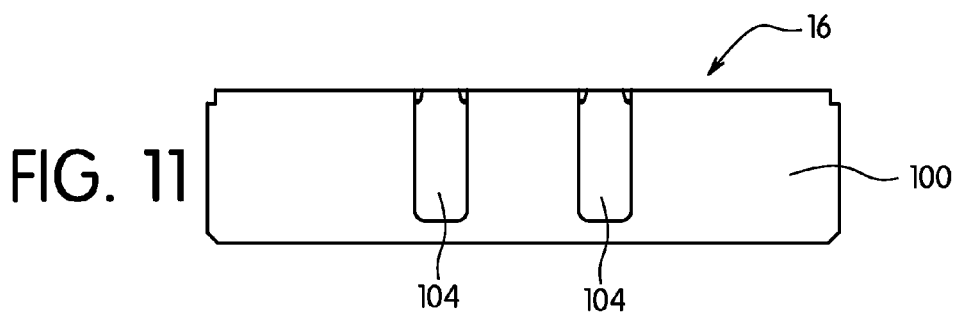

GANGABLE ELECTRICAL BOX AND LEVELING ASSEMBLY

FIELD OF THE INVENTION

The present invention is directed to a gangable electrical box having an adjustable leveling member for adjusting the position of the electrical device relative to the electrical box. The invention is particularly directed to an electrical box having a leveling member that can independently adjust the position of each end of the electrical device relative to the electrical box.

BACKGROUND OF THE INVENTION

Gangable electrical boxes are used for increasing the dimensions of the box to accept a plurality of electrical wiring devices. Gangable electrical boxes generally have removable sides so that two or more of the boxes can be coupled together. Examples of gangable electrical boxes are disclosed in U.S. Pat. No. 5,574,255 to Simmons, U.S. Pat. No. 6,229,087 to Archer, and U.S. Patent Publication No. 2004/0251043 to Chung.

Gangable electrical boxes are coupled together to form a large box capable of supporting a plurality of electrical wiring devices and to provide a large internal cavity for receiving various wires. Certain electrical devices require separation from other electrical devices by a barrier member. For example, high voltage and low voltage wiring devices are generally separated by a divider or by separate boxes. The dividers often times must be installed at the box are ganged prior to mounting the electrical devices. One example is disclosed in U.S. Pat. No. 3,587,906 to Pepe. Other electrical boxes are known that have a removable divider can be inserted or removed after the electrical box is installed. Examples of this type of assembly are disclosed in U.S. Pat. No. 5,594,207 to Fabian et al., U.S. Pat. No. 1,929,844 to Haas, and U.S. Pat. No. 6,566,600 to Ford et al.

Electrical boxes are commonly mounted to a stud or other support structure for supporting an electrical device and enclosing electrical wiring. The electrical boxes are often mounted in a variety of positions and locations in the wall or ceiling. The electrical box is typically attached to the stud or other support structure by nails, screws or other fasteners. In new construction, the electrical box is attached to the building stud with the open front face of the electrical box positioned so that the outer face of the drywall or paneling is essentially flush with the outer edge of the electrical box. In some forms of construction, the stud or other structure does not allow proper orientation of the electrical box so that the open end of the electrical box is recessed with respect to the outer surface of the wall when the wall is installed and finished.

Renovating old construction also can create difficulties in positioning the electrical box with respect to the outer surface of the wall. New wall board or paneling can be applied over existing walls so that the original electrical box is recessed within the wall and is not easily moved or relocated. The recessed electrical box results in the electrical device being recessed with respect to the wall and is not easily accessible.

A number of devices have been proposed providing an adjustable assembly for connecting to an outlet box that can accommodate for different thicknesses of wall structures and the spacing between the outer surface of a wall and an electrical box. One example is disclosed in U.S. Pat. No. 4,634,015 to Taylor which includes a plate and an open collar disposed on the mounting plate about a central opening. A box frame slides within the collar to contact the side walls of the collar. Adjustment screws are mounted in the box to connect the frame to the collar or the mounting plate to move the box outwardly of the collar.

Another example is disclosed in U.S. Pat. No. 5,931,325 to Filipov. This patent discloses an adjustable mud ring for an electrical box having a plate that can be attached to an electrical box and a collar extending outwardly from the plate. A movable sleeve surrounds the collar and is attached to the collar by screws that adjust the position.

Still another example is disclosed in U.S. Pat. No. 6,820,760 to Wegner et al. which discloses an electrical box extension having an extending member for a switch and/or electrical receptacle. The extension member includes fastener brackets and a fastener base bracket. Fasteners extend through the fastener brackets of the base bracket to adjust the relative position of the extending member to the base. Similar adjustable electrical box extensions are disclosed in U.S. Patent Application Publication No. 2005/0051354 and 2005/0082079 to Wegner et al.

Examples of other electrical boxes having an adjustable sleeve or collar to position the electrical device with respect to the electrical box are disclosed in U.S. Pat. No. 915,381 to Pullets, U.S. Pat. No. 740,663 to Krantz, U.S. Pat. No. 1,875,101 to Morrell, and U.S. Pat. No. 2,707,221 to Frank.

While each of the prior devices has been generally suitable for the intended purpose, there is a continuing need in the industry for an improved device for mounting an electrical component to an electrical box.

SUMMARY OF THE INVENTION

The present invention is directed to an electrical box that is able to accommodate one or more electrical devices. The invention is particularly directed to a gangable electrical box that can be ganged together with single or double gang units.

Accordingly, a primary aspect of the invention is to provide a gangable electrical box having interlocking tabs for coupling two or more electrical boxes together. The electrical box in one embodiment has the interlocking coupling tabs formed on the back wall of the electrical boxes that overlap and interlock with each other.

Another aspect of the invention is to provide an electrical box that includes a leveling member for adjusting the position of the electrical device with respect to the electrical box. The leveling member can adjust the position of the electrical box to accommodate different wall thicknesses and variations in the angle of the wall surface with respect to the electrical box.

A further aspect of the invention is to provide a gangable electrical box having a leveling member to adjust the angle and position of the electrical device relative to the wall and the electrical box. The leveling member in one embodiment is coupled to opposite ends of the electrical box so that each end of the electrical device can be selectively adjusted independently of the other end.

Still another aspect of the invention is to provide an electrical box with an adjustable member for supporting the electrical device where the electrical device has a fastener extending through a flange on the electrical box and the adjustable member.

A further feature of the invention is to provide an electrical box having a removable divider plate coupled to the electrical box. The electrical box has an adjustable member for supporting the electrical device. The divider plate can pass through the adjustable member so that the divider plate can be inserted into the electrical box after the electrical box is installed.

Another aspect of the invention is to provide an electrical box having an adjustable leveling member at each end for independently adjusting the ends of the electrical device and side members extending between the leveling members. The side members are independent of the leveling members and slidably coupled to the side walls of the electrical box. In one embodiment, the side members have an end that is coupled to each of the leveling members so that the position of the side members is adjusted by adjustment of the leveling member.

These and other aspects of the invention are basically attained by providing a gangable electrical box comprising a body having a rear wall, a first end wall, a second end wall, an open top, and first and second open sides. A first leveling member has a support surface for supporting a first end of an electrical device. The first leveling device is coupled to the first end wall and is adjustable with respect to the first end wall in an outward direction with respect to the first end wall. A second leveling member has a support surface for supporting a second end of the electrical device. The second leveling device is coupled to the second end wall and is adjustable with respect to the second end wall in an outward direction with respect to the second wall. The second leveling member is adjustable independently of the first leveling member. A side wall is removably coupled to one of the open sides of the body.

The various aspects of the invention are further attained by providing a gangable electrical box comprising a body having a rear wall, a first end wall, a second end wall and first and second open sides. A first leveling member is coupled to the first end wall. The first leveling member has a support surface for supporting an electrical device in an open top end of the body. The first leveling member is adjustable with respect to the first end wall. A side wall is removably coupled to an open side of the body, and the body can be coupled to a second gangable electrical box.

The various features of the invention are also attained by providing an electrical box comprising a body having a first end wall and a second end wall. An adjustable first leveling member is coupled to a first end of the body and an adjustable second leveling member is coupled to a second end of the body. The first leveling member is adapted for supporting a first end of an electrical device and the second leveling member is adapted for supporting a second end of the electrical device. Each leveling member is independently adjustable with respect to the body.

These and other features of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which:

FIG. 7 is an exploded view of the electrical box assembly of FIG. 1;

FIG. 8 is an enlarged view of detail A of the adjustment screw for the leveling member;

FIG. 9 is a perspective view of the leveling member in one embodiment of the invention;

FIG. 10 is a top view of the leveling member of FIG. 9;

FIG. 11 is a side view of the leveling member of FIG. 9;

DETAILED DESCRIPTION OF THE INVENTION

Figure 1:
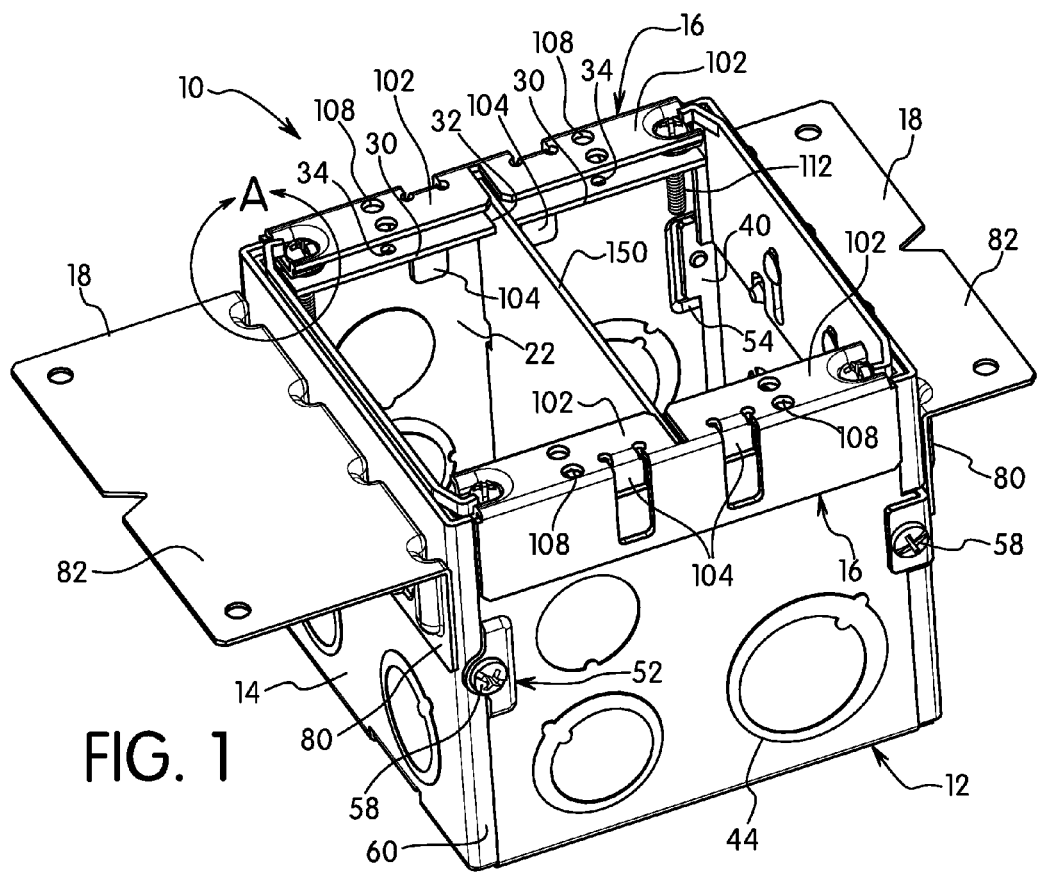
FIG. 1 is a perspective view of the electrical box assembly in one embodiment of the invention.

The present invention is directed to an electrical box that is adapted for supporting a plurality of electrical devices such as electrical duplex receptacles and switches. The invention is particularly directed to a gangable electrical box having a leveling adjustment member to position the electrical devices at a desired position with respect to the electrical box.

Referring to the drawings, the electrical box assembly 10 of the invention includes an electrical box 12 having removable side walls 14. Leveling members 16 are coupled to the electrical box for supporting the electrical device. Mounting brackets 18 are attached to each of the side walls 14.

Figure 2:
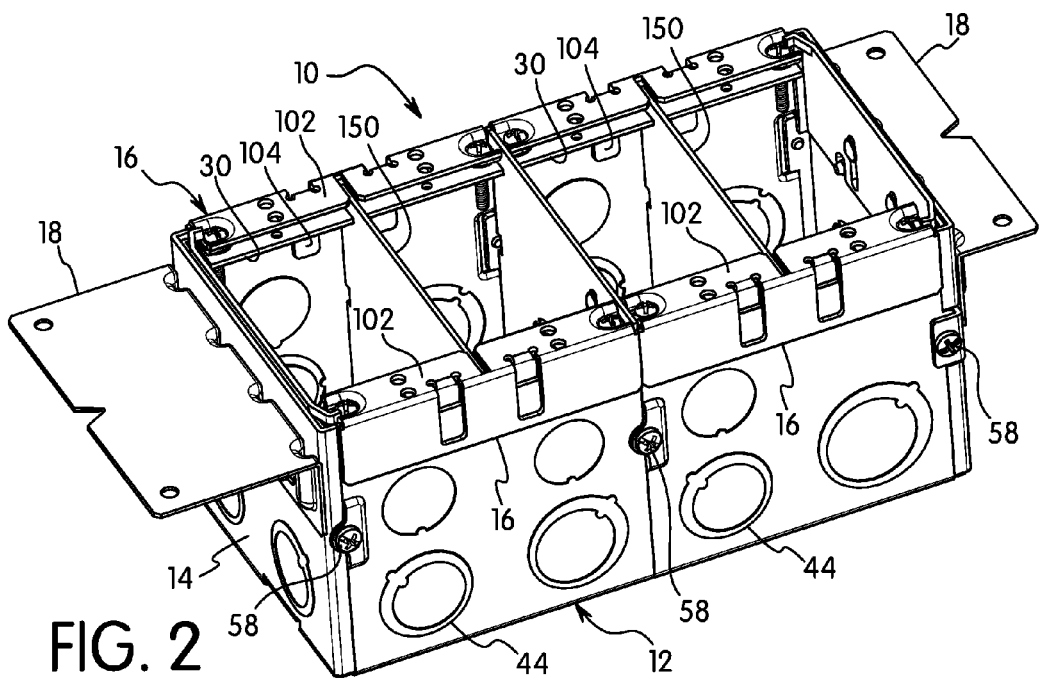
FIG. 2 is a perspective view of the electrical box of FIG. 1 ganged together.

The electrical box 12 in preferred embodiments is a gangable electrical box so that a plurality of the electrical boxes can be coupled together for supporting a plurality of electrical devices as shown in FIG. 2. The electrical box can have different arrangements of the knockout and pry out plugs for coupling wires and cables to the electrical device. The electrical boxes having different arrangements of the knockout plugs can be ganged together as shown in FIG. 2. In a preferred embodiment of the invention, the electrical box is a two gang box that can be ganged together with a single gang box or a triple gang box, depending on the particular use of the electrical box.

Electrical box 12 as shown in FIGS. 1-7 has removable side walls 14 so that the electrical box can be ganged with another electrical box. Electrical box 12 has a rear or back wall 20 and opposite end walls 22. Back wall 20 includes a plurality of apertures 24 for receiving mounting screws or other fasteners. Raised portions 26 have a screw hole 28 for mounting a grounding wire. In one preferred embodiment, back wall 20 and end walls 22 are formed as a one-piece unit stamped from a metal blank.

End walls 22 extend perpendicular from back wall 20 and define a cavity of the electrical box with an open top end. End walls 22 are substantially the same and terminate at a top end with an inwardly extending flange 30. In the embodiment shown, flange 30 has a longitudinal dimension extending substantially the width of the end wall 22. A slot 32 divides the flange 30 into two portions corresponding to separate supports for two electrical devices. Each portion of the flange includes a centrally located threaded hole 34 for receiving a mounting screw or other fastener for the electrical device. The longitudinal ends of the flange 30 have a threaded hole 36 for receiving an adjustment screw for leveling and adjusting the position of the electrical device.

Figure 3:
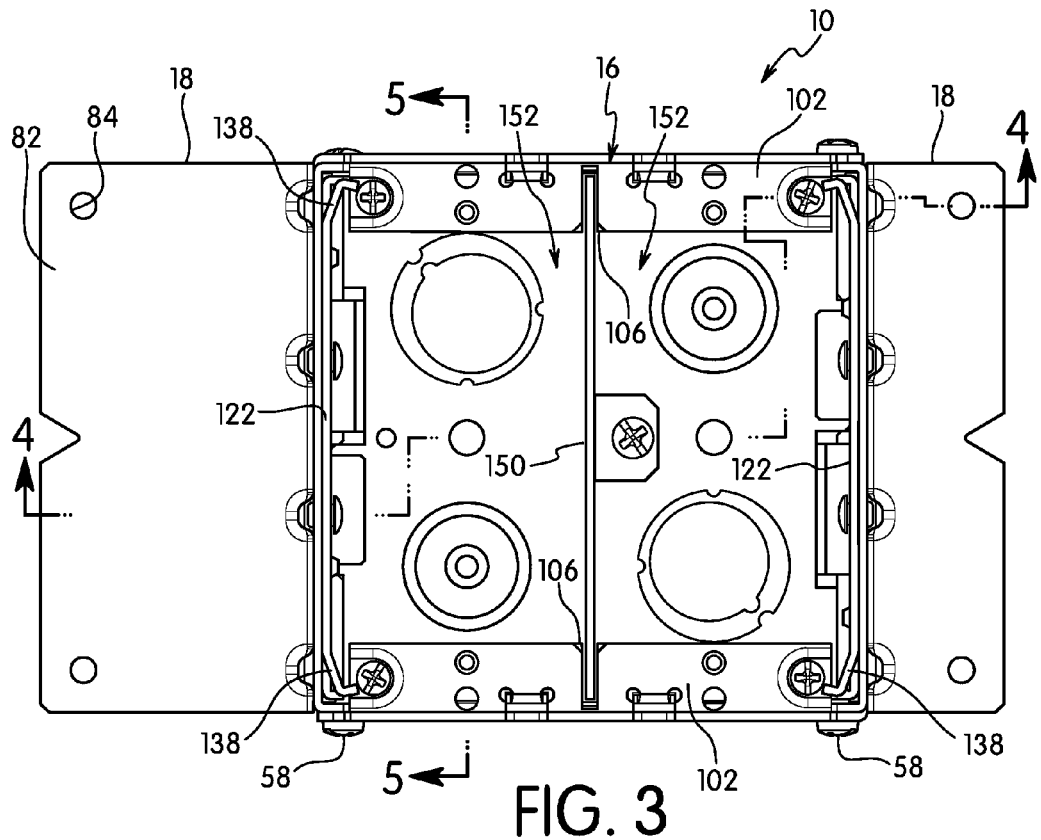
FIG. 3 is a top view of the electrical box assembly of FIG. 1.

Back wall 20 includes a pair of tabs for coupling with the side wall and for coupling with an adjacent electrical box when ganged together. As shown in FIG. 3, back wall 20 includes a first tab 40 lying in the plane of back wall 20 on each side edge and a second tab 42 spaced upwardly from first tab 40 and adjacent to first tab 40. Second tab 42 is bent to extend parallel to first tab 40 and spaced above first tab 40 to interlock with tabs of an adjacent electrical box or side wall. As shown in FIG. 3, each side edge of back wall 20 includes a first coupling tab 40 and a second coupling tab 42 that are aligned to mate with respective coupling tabs of a ganged electrical box in an interlocking fashion.

End walls 22 include a plurality of knockouts 44 for making suitable electrical connections. End walls 22 have a first side edge 46 with a coupling tab 48 lying in the plane of the end wall and extending outwardly therefrom. End walls 22 have a second side edge 50 with a coupling tab 52 for mating with a coupling tab 48 of an adjacent electrical box when ganged together. Coupling tab 52 as shown in FIG. 3 is punched from the end wall to form a recess with a dimension to receive a coupling tab 48. Each of the coupling tabs include a screw hole 56 for receiving a screw 58 for joining the electrical boxes together as shown in FIGS. 1 and 2.

Figure 14:
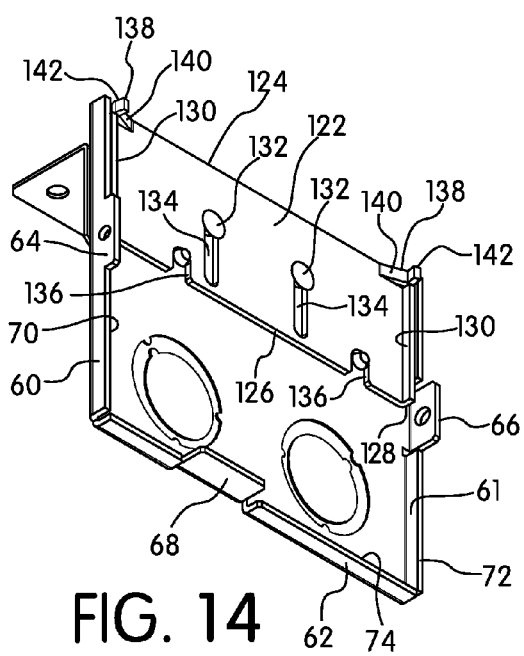
FIG. 14 is a bottom perspective view of the rear side of the side wall of FIG. 12 showing the adjustable side member.

Side walls 14 have a planar configuration with a dimension to close the open sides of the electrical box 12. Side walls 14 have a flange 60 and 61 for mating with the edges of the end walls 22 of the electrical box 12 as shown in FIG. 1 and FIG. 3. Flanges 60 and 61 in the embodiment shown contact the end face of the end walls. In other embodiments, the flanges can contact the outer face of the end walls. A bottom flange shown in FIG. 11 extends perpendicular from the side wall for mating with the back wall 22. Side flange 60 includes a coupling tab 64 extending in the plane of the first flange as shown in FIG. 14. Coupling tab 64 has a dimension to fit within the recess 54 of the coupling tab 52 of the end wall of the electrical box. Side flange 61 includes a coupling tab 66 that is spaced outwardly from the plane of the side flange 61. Coupling tab 66 is spaced from the plane of the flange to overlie the coupling tab 48 of the end wall 22 of the electrical box.

The bottom edge of the end wall 22 includes a coupling tab 68 that is spaced inwardly from the bottom flange 62. Coupling tab 68 has a dimension to overlie the coupling tab 40 on the back wall 20. Coupling tab 42 of the back wall 20 overlies the top surface of the bottom flange 63.

In the embodiment illustrated, the side flanges 60, 61 and bottom flange 62 have an outer longitudinal edge 70, 72 and 74, respectively, that abut the longitudinal ends of the end walls 22 and back wall 20 as shown in FIG. 1. The coupling tabs of the respective side flanges and bottom flanges extend from the longitudinal edge of the respective flange to overlie the end walls and back wall for coupling the side walls to the electrical box and align the edges of the flanges 60, 61 and 62 with the ends of the end walls 14 and back wall 20. The dimensions of the flanges of the end wall enable the volume or capacity of the assembly defined by the electrical box and end walls to be increased.

Figure 12:
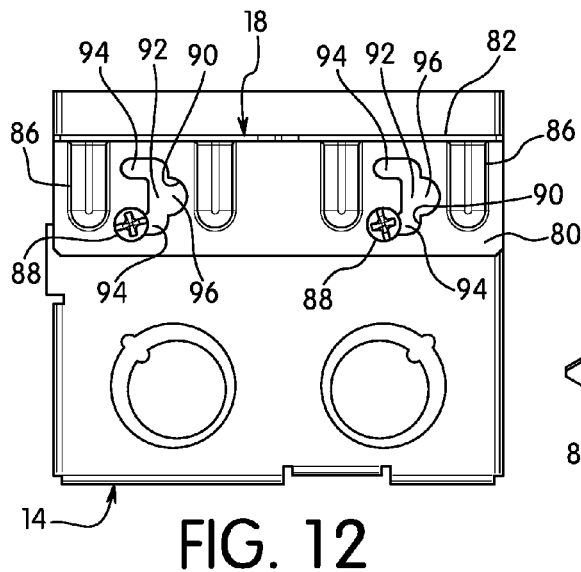
FIG. 12 is an elevational view of the side wall and the mounting bracket of the electrical box assembly.
Figure 13:
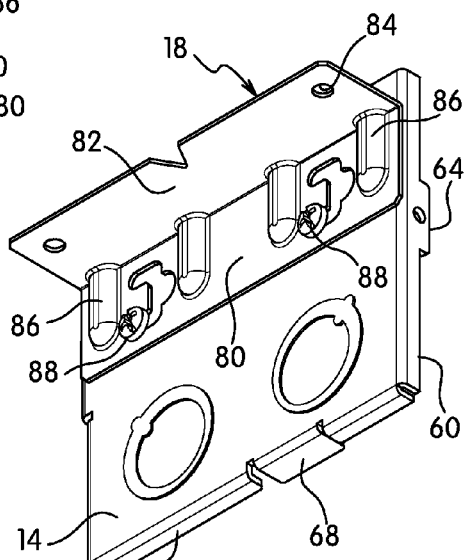
FIG. 13 is a bottom perspective view of the front side of the side wall of FIG. 12.

Mounting brackets 18 are coupled to each of the side walls 14 for mounting the electrical box assembly to a support structure. As shown in FIG. 1, a mounting bracket 18 is attached to each of the side walls and differ from each other by the dimensions of the mounting bracket. Each of the mounting brackets 18 have a substantially L-shaped configuration with a side wall 80 and a top wall 82 extending perpendicular to the side wall 80. The top wall 80 includes an aperture 84 for receiving a fastener to mount the electrical box assembly 10 to a support structure. The side wall 80 includes embossed ribs 86 to strengthen the mounting bracket. The mounting bracket 18 is attached to the respective side wall 14 by a screw 88 passing through a slot 90 as shown in FIG. 12. Slot 90 has a vertical section 92 and horizontal sections 94 at the longitudinal ends of the vertical section 92. Vertical section 92 also includes a horizontal section 96 positioned at about the midpoint between the horizontal sections 94. Each of the horizontal sections 94 are oriented to position the mounting bracket at a predetermined distance from top edge of the electrical box assembly to accommodate different wall thicknesses. Horizontal section 96 has a dimension to allow the head of screw 88 to pass through for easy assembly and removal of the mounting bracket 18 from the respective side wall 14.

Figure 6:
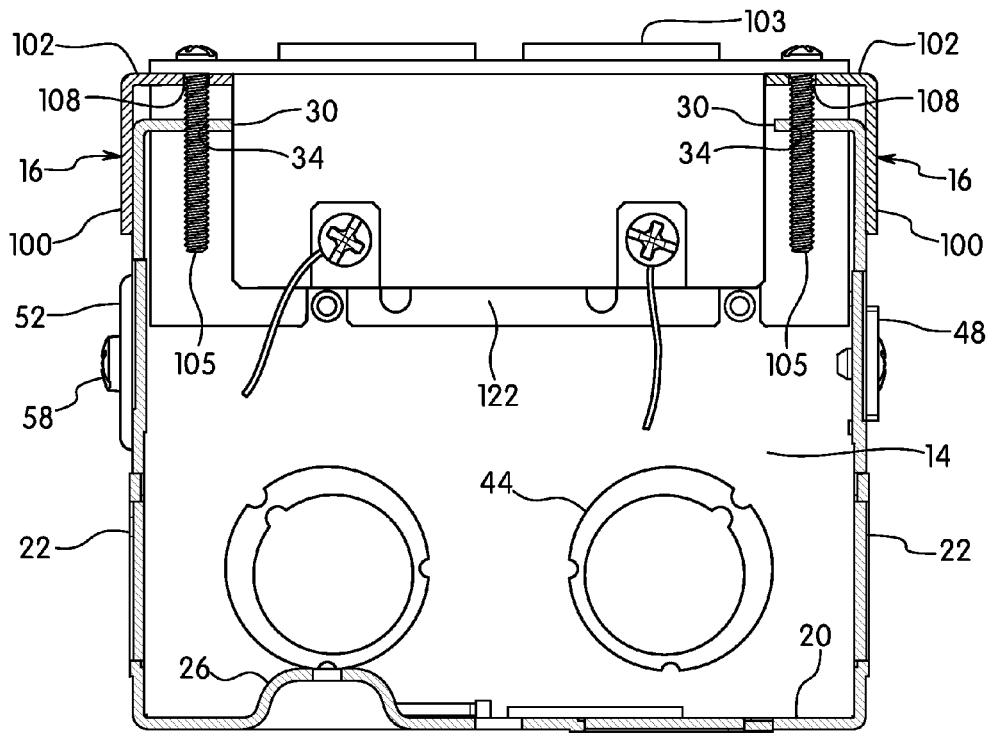
FIG. 6 is a cross-sectional view of the electrical box assembly showing the electrical wiring device mounted in the electrical box.

As shown in FIGS. 9-11, leveling members 16 have a substantially L-shape and are coupled to each of the end walls of the electrical box 12. Leveling member 16 has a side wall 100 and a mounting flange 102 extending from a top edge of side wall 100 in a direction substantially perpendicular to the plane of side wall 100. Mounting flange 102 has a dimension sufficient to support an electrical device such as a duplex receptacle 103 as shown in FIG. 6. Guide tabs 104 are punched from side wall 100 as shown in FIG. 9 and are spaced inwardly from the inner face of side wall 100 a distance corresponding substantially to the thickness of the end walls of the electrical box 12. As shown in FIGS. 1 and 3, side wall 100 slides on the outer face of the end walls 22 and guide tabs 104 slide on the inner surface of the end walls 22 to guide the leveling members 16 in a linear direction with respect to the end walls. Flange 30 of the electrical box includes a slot 105 to receive the respective guide tab 104. In the embodiment illustrated, side wall 100 includes two guide tabs 104 spaced apart from each other to guide the movement of the leveling member 16 with respect to the end wall 22.

Mounting flange 102 has a longitudinal length corresponding substantially to the length of side wall 100 of leveling member 16. As shown in FIG. 1, leveling member 16 has a longitudinal length corresponding substantially to the width of the end wall 22 and the flange 30 of end wall 22. Mounting flange 102 includes a transverse slot 106 aligned with the slot 32 in the flange 30 on the end walls 22. In the embodiment illustrated, leveling member 16 has a longitudinal length sufficient to accommodate two electrical devices mounted side by side. Guide holes 108 extend through mounting flange 102 and are aligned with a respective threaded hole 34 in the flange 30. In the illustrated embodiment, guide holes 108 have a dimension to allow a fastener such as a mounting screw 105 to pass through the mounting flange 102 and screw into the respective threaded hole 34 in flange 30 for coupling the electrical receptacle 103 to the electrical box assembly 10. Guide holes 108 have a dimension to allow clearance between the mounting screw so that the mounting screws can pass through the mounting flange and thread into the flange 30 without interference from the mounting flange 102.

Each longitudinal end of mounting flange 102 includes a recessed portion 110 having a screw hole for receiving an adjustment screw 112. The recess 110 has a dimension to receive the head 114 of adjustment screw 112 so that head 114 is positioned flush with or below the top surface of mounting flange 102. A lock washer 116 is coupled to the threaded shaft 118 of adjustment screw 112 to capture the adjustment screw 112 to the mounting flange 102. The lock washer 116 allows the adjustment screw 112 to rotate freely within the screw hole while limiting axial movement of the adjustment screw 112 within the screw hole. The recess 110 and the screw hole are aligned with the threaded hole 36 in flange 30 so that adjustment screw 112 passes through the mounting flange 102 and flange 30 on end wall 22. In the embodiment illustrated, adjustment screw 112 is threaded into the threaded hole 36. Rotating the adjustment screw 112 adjusts the position of the leveling member 16 with respect to the end wall 22.

Preferably, each leveling member 16 includes an adjustment screw 112 at each longitudinal end that is threaded into a threaded hole in the flange 30 where each adjustment screw can be independently adjusted. The independent adjustment of each of the adjustment screws enables the longitudinal ends of the leveling member to be independently adjusted, thereby adjusting the angle of the leveling member with respect to the top edge of the electrical box assembly 10. The leveling members 16 are coupled to each of the end walls 22 and are independently adjustable with respect to each other. Each leveling member 16 can be adjusted to accommodate differences in the wall depth and imperfections in the wall.

Figure 5:
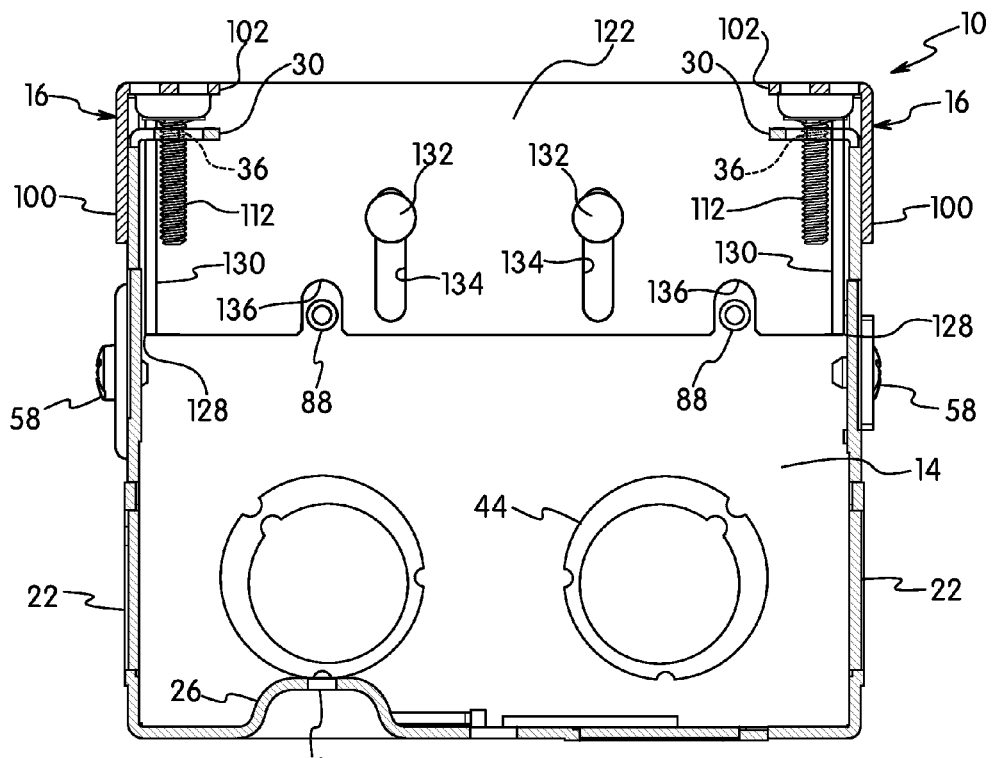
FIG. 5 is a cross-sectional view of the electrical box assembly taken along line 5-5 of FIG. 3.

Electrical box assembly 110 includes side members 122 extending between leveling members 16. Side members 122 are adjustable with respect to the respective end wall 22 in a linear direction corresponding to the direction of adjustment of the leveling members 16. In one embodiment of the invention, side members 122 are slidably connected to the respective side wall 14. As shown in FIG. 10, side member 122 has a planar configuration with a top edge 124, a bottom edge 126, and side edges 128. An outwardly extending flange 130 extends from each side edge 128 in a direction substantially perpendicular to the plane of the side member 122. As shown in FIG. 5, side member 122 has a longitudinal length corresponding substantially to the width of the side wall 14 and slides between the flanges of the side wall 14. Side member 122 is coupled to side wall 14 by rivets 132 or other fasteners that slide within longitudinal slots 134 in side member 122. The bottom edge 126 in the embodiment illustrated has two spaced-apart U-shaped recesses 136 to accommodate the screws 88 of the mounting bracket 18. As shown, slots 134 have a longitudinal dimension and are oriented to allow the side member 122 to slide between a retracted position shown in FIGS. 5 and 14 and an extended position corresponding to the position of the leveling member 16.

Figure 4:
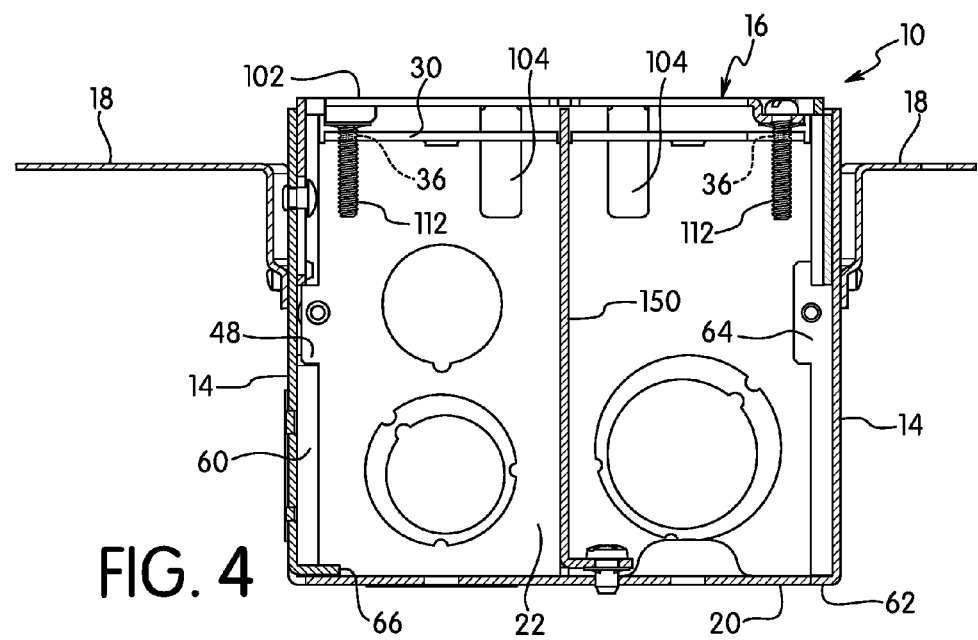
FIG. 4 is a cross-sectional view of the electrical box assembly taken along line 4-4 of FIG. 3.

The top edge 124 of side member 122 includes a tab 138 at each longitudinal end. The tab 138 includes a first leg 140 bent out of the plane of the side member and a second leg 142 bent with respect to the first leg 140. As shown in FIG. 4, the second leg 142 is bent outwardly from the plane of the side member to engage the recess 110 in the leveling member 16. The second leg 142 engages the leveling member 16 so that adjustment of the position of the leveling member 16 simultaneously adjusts the position of the side member 122.

Figure 15:
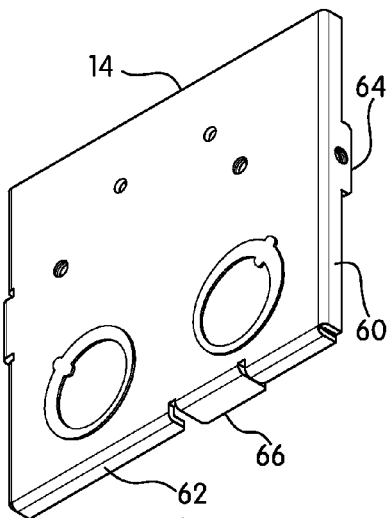
FIG. 15 is a perspective view of the side wall with the mounting bracket removed.
Figure 16:
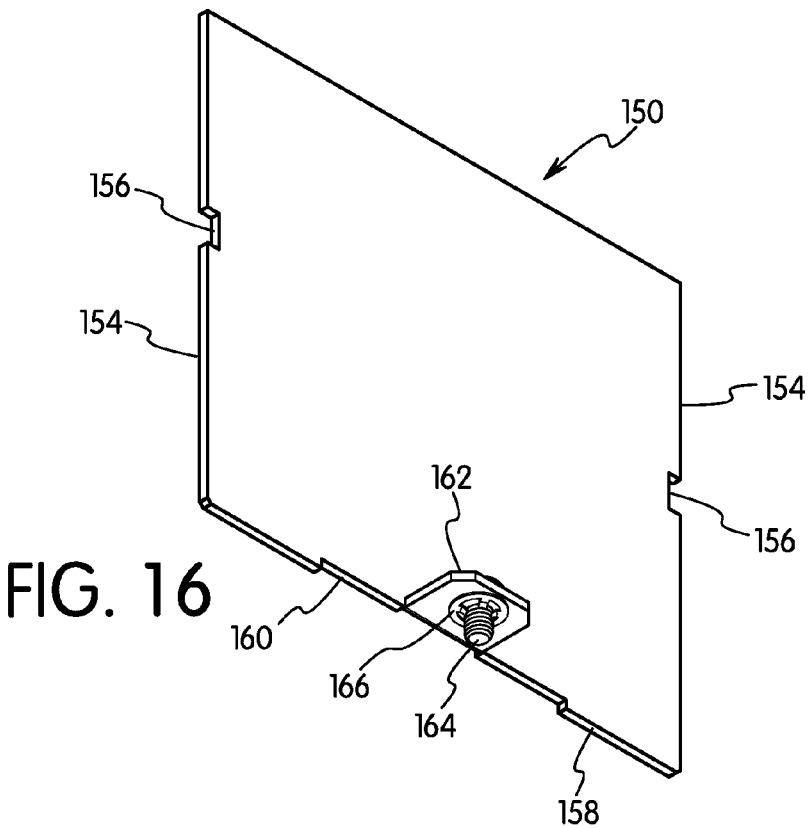
FIG. 16 is a perspective view of the divider plate in one embodiment of the invention.
Figure 17:
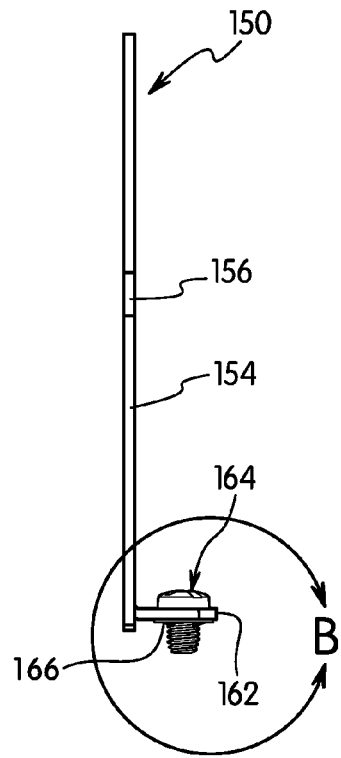
FIG. 17 is an end view of the divider plate of FIG. 16.
Figure 18:
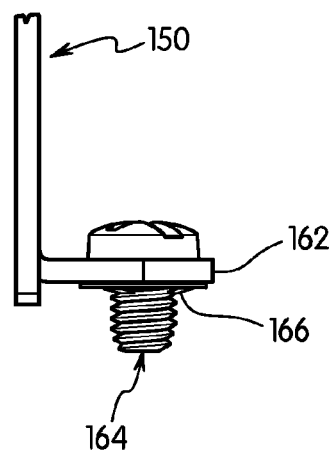
FIG. 18 is an enlarged view of detail B of the coupling screw of the divider plate of FIG. 16.

A divider plate 150 can be coupled to the electrical box assembly 110 to divide the electrical box into compartments 152 as shown in FIG. 15. Divider plate 150 has a planar configuration and a dimension to fit between the end walls 22 and between the back wall 20 and the top edge of the electrical box 12. Divider plate 150 includes side edges 154 with a notch 156. A bottom edge 158 has a recessed notch 160 and a coupling tab 162. Coupling tab 162 extends perpendicular from the plane of the divider plate 150 and includes a screw hole for receiving a coupling screw 164 as shown in FIG. 4. As shown in FIG. 18, a locking washer 166 is coupled to the shaft of the screw 164 to capture the screw and prevent separation of the screw from the coupling tab 162. Screw 164 is threaded into the screw hole 28 in the back wall 20 for coupling the divider plate 150 to the assembly 10.

Divider plate 150 can be coupled to the assembly after the assembly is mounted by sliding the divider plate 150 through the slot 106 in leveling member 16 and slot 32 in flange 30 on the respective end wall. Divider plate 150 has a dimension to extend to the top edge of the electrical box and be captured within the slot 32 to resist lateral movement of the divider plate.

As shown in the drawings, the electrical box assembly 10 is adapted for use in various mounting arrangements and can be ganged to accommodate a desired number of electrical devices. The mounting brackets are adjustable to position the top edge of the electrical box assembly at a selected position with respect to the wall surface. The divider plates can be inserted as needed after the electrical box assembly is mounted to the support surface without disassembling the electrical box by sliding the divider plate through the slots in the leveling members and the top flange of the end walls. The leveling members allow independent adjustment of each end of the electrical device. The adjustment screws at each end of the leveling members also allow adjustment of the angle of the leveling members with respect to the electrical box to accommodate variations in the wall surface.

While various embodiments have been chosen to illustrate the invention, it will be understood by those skilled in the art that various changes and modifications can be made without departing from the scope of the invention as defined in the appended claims.

What is claimed is:

1. A gangable electrical box comprising:
   a back wall, a first end wall, a second end wall, an open front, first and second side edges and a side wall;
   a first leveling member having a mounting flange for supporting an electrical device, said mounting flange extending inwardly with respect to said electrical box, said first leveling member being coupled to said first end wall and being adjustable with respect to said first end wall in a linear direction with respect to said first end wall for adjusting the position of the first end of the electrical device relative to the electrical box;
   a second leveling member having a mounting flange for supporting the electrical device, said flange extending inwardly with respect to said electrical box, said second leveling member being coupled to said second end wall and being adjustable with respect to said second end wall in a linear direction with respect to said second end wall for adjusting the position of the second end of the electrical device relative to the electrical box, said first leveling member and said second leveling member being adjustable independently of each other; and
   a side member extending between said first and second leveling members and having a top edge with a tab at longitudinal ends engaging the leveling members so that adjustment of the leveling members adjust the position of the side member.

2. The electrical box of claim 1, wherein said electrical box is a multi-gang unit adapted for supporting a plurality of electrical devices, and where said electrical box is adapted for coupling to a second electrical box to form a multi-gang electrical box.

3. The electrical box of claim 1, wherein said side member is separable from said first and second leveling members.

4. The electrical box of claim 3, wherein said side member is slidably coupled to said side wall.

5. The electrical box of claim 4, wherein said side member is slidably connected to said side wall.

6. The electrical box of claim 1, wherein said first and second leveling members each have a side wall slidably coupled to said respective end wall.

7. The electrical box of claim 6, wherein
said first and second end walls have a top edge with an inwardly extending flange, said inwardly extending flange having a threaded mounting hole for receiving a mounting screw of said electrical device, and where said mounting flange of each leveling member has an aperture aligned with said threaded mounting hole to allow the mounting screw to pass through.

8. The electrical box of claim 7, wherein
each said mounting flange has an aperture receiving an adjustment screw and where said inwardly extending flange of said respective end wall has a screw hole for said adjustment screw to adjust the position of said respective leveling member relative to the end wall.

9. The electrical box of claim 6, further comprising
a divider plate extending between said first and second end walls.

10. The electrical box of claim 9, wherein
each of said mounting flanges has a slot adapted for receiving said divider plate.

11. The electrical box of claim 10, wherein
each said end wall has a top edge with an inwardly extending flange having a slot adapted for receiving said divider plate and resisting lateral movement of said divider plate.

12. A gangable electrical box comprising:
a back wall, a first end wall with a flange extending inwardly and having a first longitudinal end with a first threaded hole with a first adjustment screw, and a second longitudinal end with a second threaded hole with a second adjustment screw, a second end wall and first and second side edges;
a first leveling member coupled to said first end wall, said first leveling member having a mounting flange extending inwardly with respect to the electrical box for supporting an electrical device in said electrical box, said first leveling member having a first longitudinal end with a screw hole receiving said first adjustment screw and a second longitudinal end with a screw hole receiving said second adjustment screw to enable the longitudinal ends of said first leveling member to be independently adjusted; and
a removable side wall coupled to said first side edge of said electrical box, and where said electrical box can be coupled to a second gangable electrical box.

13. The electrical box of claim 12, further comprising
a flange extending inwardly from said second end wall,
a second leveling member coupled to said second end wall, said second leveling member having a mounting flange extending inwardly with respect to said electrical box for supporting the electrical device and being independently adjustable with respect to said first leveling member.

14. The electrical box of claim 13, further comprising
a side member extending between said first and second end walls and being coupled to said first leveling member and second leveling member and being adjustable with respect to said electrical box by adjustment of said first leveling member and second leveling member.

15. The electrical box of claim 14, wherein
said side member has a top edge with a tab at a first end engaging the top edge of said first leveling member and a tab at a second end engaging said second leveling member.

16. The electrical box of claim 15, wherein
said side member is slidably connected to a side wall of said electrical box.

17. The electrical box of claim 13, wherein
said flange extending inwardly from said second end wall has a first longitudinal end with a first threaded hole receiving a first adjustment screw, and a second longitudinal end with a second threaded hole receiving a second adjustment screw, and
a second leveling member having a first longitudinal end with a screw hole receiving said first adjustment screw and a second longitudinal end with a screw hole receiving said second adjustment screw, said adjustment screws enabling said longitudinal ends of said second leveling member to be independently adjusted.

18. The electrical box of claim 17, wherein
each of said adjustment screws have a head and a lock washer to capture said adjustment screw to the respective mounting flange.

19. The electrical box of claim 12, wherein
said first leveling member further includes a side wall slidably coupled to said first end wall.

20. The electrical box of claim 12, further comprising
a mounting bracket coupled to said side wall and being adjustable with respect to a top edge of said side wall.

21. An electrical box comprising:
a first end wall having an inwardly extending flange with a threaded hole for receiving a mounting screw and a second end wall having an inwardly extending flange with a threaded hole for receiving a mounting screw;
a first leveling member coupled to said first end wall of said electrical box; and
a second leveling member coupled to said second end wall of said electrical box;
said first leveling member having a mounting flange extending inwardly for supporting an electrical device and having a guide hole to receive the mounting screw and being aligned with said threaded hole in said flange of said first end wall and said second leveling member having a mounting flange extending inwardly for supporting the electrical device and having a guide hole to receive the mounting screw aligned with said threaded hole in said flange of said second end wall, each said leveling member being independently adjustable with respect to each other.

22. The electrical box of claim 21, wherein
said electrical box is gangable and has a first open side edge, and a second open side edge, said electrical box being adapted for coupling to a second electrical box; and
said electrical box further comprising at least one side wall coupled to said first or second open side edge.

23. The electrical box of claim 21, further comprising
an adjustment member extending between each of said mounting flange and respective flange.

24. The electrical box of claim 23, wherein
said adjustment member is a screw, and said mounting flange includes an aperture receiving said screw where said screw is axially fixed and rotatable in said aperture; and
said flange includes a threaded aperture receiving said screw for adjusting the position of said leveling member relative to said electrical box.

25. The electrical box of claim 21, further comprising
a side member extending between said first and second leveling members, said side member being coupled to said leveling members.

26. The electrical box of claim 25, further comprising
a side wall coupled to said first and second side walls, and where said side member is slidably coupled to said side wall.

* * * * *